United States Patent
Saito et al.

(10) Patent No.: US 12,202,490 B2
(45) Date of Patent: Jan. 21, 2025

(54) VEHICLE, VEHICLE CONTROL METHOD, AND PROGRAM

(71) Applicant: HONDA MOTOR CO., LTD., Tokyo (JP)

(72) Inventors: Jin Saito, Wako (JP); Noriyuki Matsuda, Chuo-ku (JP)

(73) Assignee: HONDA MOTOR CO., LTD., Tokyo (JP)

( * ) Notice: Subject to any disclaimer, the term of this patent is extended or adjusted under 35 U.S.C. 154(b) by 379 days.

(21) Appl. No.: 17/618,898

(22) PCT Filed: Jun. 25, 2019

(86) PCT No.: PCT/JP2019/025050
§ 371 (c)(1),
(2) Date: Dec. 14, 2021

(87) PCT Pub. No.: WO2020/261358
PCT Pub. Date: Dec. 30, 2020

(65) Prior Publication Data
US 2022/0363269 A1    Nov. 17, 2022

(51) Int. Cl.
*B60W 40/12* (2012.01)
*B60W 40/02* (2006.01)
*B60W 50/14* (2020.01)

(52) U.S. Cl.
CPC ........... *B60W 40/12* (2013.01); *B60W 40/02* (2013.01); *B60W 50/14* (2013.01);
(Continued)

(58) Field of Classification Search
CPC ...... B60W 40/12; B60W 40/02; B60W 50/14; B60W 2556/45; B60W 2050/146; B60W 2510/06; B60W 2510/242
See application file for complete search history.

(56) References Cited

U.S. PATENT DOCUMENTS 6,288,506 B1 *   9/2001   Hiwatari ............... G05B 9/02
                                                        180/281
6,650,244 B1 *   11/2003  Chen .................. G08B 21/20
                                                        340/463
(Continued)

FOREIGN PATENT DOCUMENTS

CN    203126536 U    8/2013
CN    104442658      3/2015
(Continued)

OTHER PUBLICATIONS

Japanese Notice of Allowance for Japanese Patent Application No. 2021-528680 mailed Jun. 21, 2022.
(Continued)

*Primary Examiner* — Naeem Taslim Alam
(74) *Attorney, Agent, or Firm* — Amin, Turocy & Watson, LLP

(57) ABSTRACT

A vehicle including: a communicator configured to communicate with an external terminal; an acquirer configured to acquire detection results acquired by sensors disposed in predetermined portions of the vehicle; an estimator configured to estimate submerged portions of the vehicle that is submerged on the basis of the detection results acquired by the acquirer; and a controller configured to change a communication destination of the vehicle by controlling the communicator in accordance with the submerged portions estimated by the estimator.

17 Claims, 14 Drawing Sheets

(52) U.S. Cl.
CPC ... *B60W 2050/146* (2013.01); *B60W 2510/06* (2013.01); *B60W 2510/242* (2013.01); *B60W 2556/45* (2020.02)

(56) References Cited

U.S. PATENT DOCUMENTS

| | | | |
|---|---|---|---|
| 9,206,637 B2* | 12/2015 | Percher | E05F 15/695 |
| 10,255,782 B1* | 4/2019 | Ghannam | G08B 21/20 |
| 2003/0197599 A1* | 10/2003 | Kim | B63C 9/24 |
| | | | 340/573.6 |
| 2011/0199219 A1* | 8/2011 | Smith | A62B 99/00 |
| | | | 340/604 |
| 2012/0070757 A1* | 3/2012 | Katano | H01M 8/04291 |
| | | | 429/444 |
| 2013/0059866 A1 | 3/2013 | Kim et al. | |
| 2016/0059866 A1* | 3/2016 | Kim | B60K 28/10 |
| | | | 701/22 |
| 2017/0045006 A1* | 2/2017 | Scinicariello | F02M 35/10078 |
| 2018/0058408 A1* | 3/2018 | Chen | B60R 16/0231 |
| 2019/0323440 A1* | 10/2019 | Llusho | F02M 35/10013 |
| 2019/0337520 A1* | 11/2019 | Weissenmayer | G01N 29/024 |
| 2020/0130522 A1* | 4/2020 | Motohira | B60L 3/0092 |
| 2021/0323446 A1* | 10/2021 | Christensen | B60N 2/42736 |

FOREIGN PATENT DOCUMENTS

| | | |
|---|---|---|
| CN | 205098045 | 3/2016 |
| CN | 205131084 U | 4/2016 |
| CN | 105730262 | 7/2016 |
| CN | 207029149 U | 2/2018 |
| CN | 107798817 | 3/2018 |
| CN | 1207133960 | 3/2018 |
| CN | 108297817 | 7/2018 |
| CN | 208119100 | 11/2018 |
| CN | 208688606 | 4/2019 |
| JP | 2001-088638 | 4/2001 |
| JP | 2006-256370 | 9/2006 |
| JP | 2009-292290 | 12/2009 |
| JP | 2013-052835 | 3/2013 |
| JP | 2015-136969 | 7/2015 |

OTHER PUBLICATIONS

Chinese Office Action for Chinese Patent Application No. 201980097429.8 mailed Aug. 16, 2023.
Chines Office Action for Chinese Patent Application No. 201980097429.8 mailed Feb. 16, 2023.
International Search Report and Written Opinion for International Application No. PCT/JP2019/025050 mailed on Aug. 27, 2019, 11 pages.

* cited by examiner

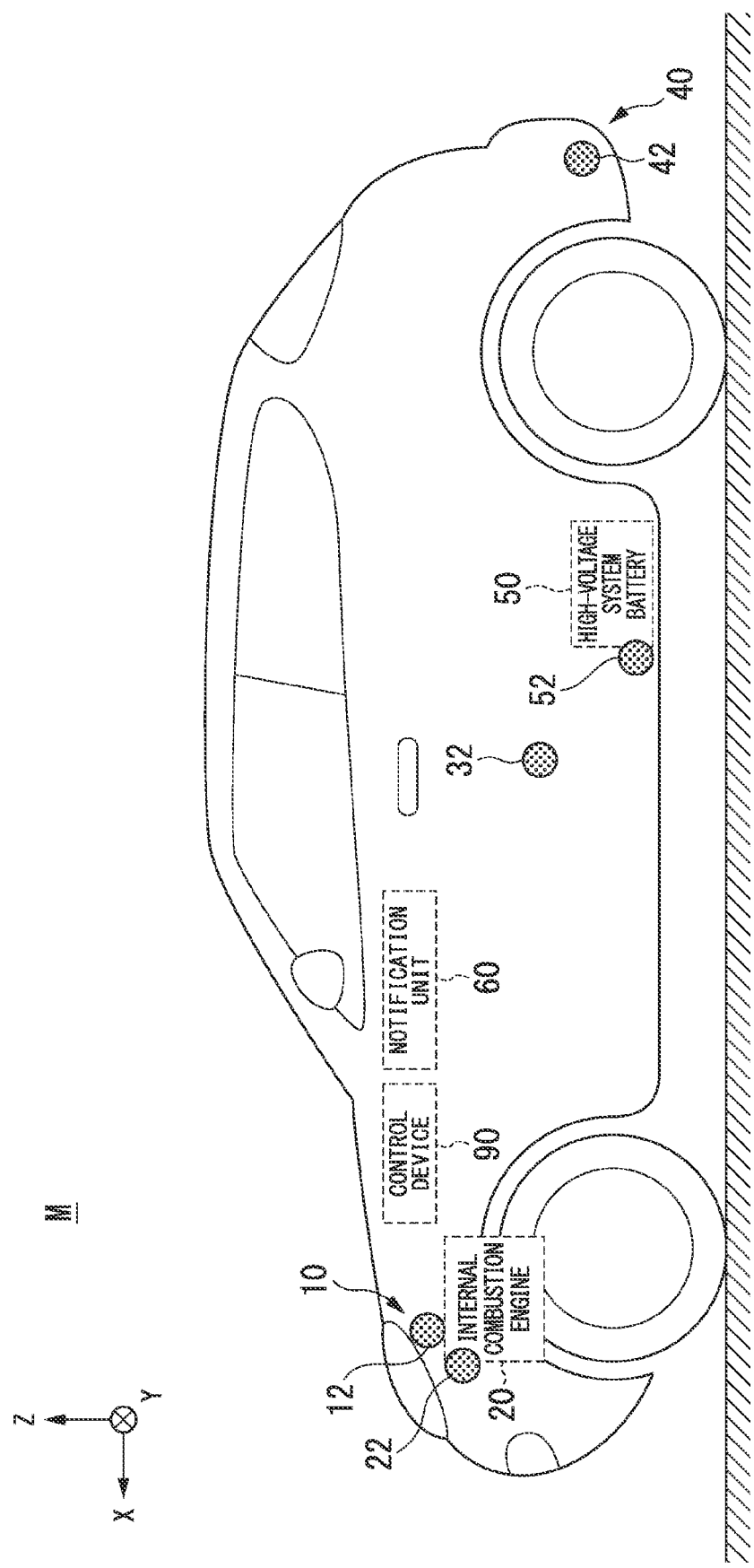

WATER LEVEL ↑

| IDENTIFICATION NUMBER | TYPE OF SPECIFIC DEVICE | CONTROL DETAILS OF CONTROL UNIT AT TIME OF SUBMERGENCE |
|---|---|---|
| | CONTROL DEVICE | |
| | COMMUNICATION UNIT | |
| (5) | AIR CLEANER / INTAKE SUBMERGENCE SENSOR | PROVIDE INFORMATION WARNING MALFUNCTION OF INTERNAL COMBUSTION ENGINE |
| (4) | INTERNAL COMBUSTION ENGINE / ENGINE SUBMERGENCE SENSOR | PROVIDE INFORMATION WARNING OF STOPPING OF INTERNAL COMBUSTION ENGINE |
| (3) | DOOR SUBMERGENCE SENSOR | NOTIFY NOTIFICATION FACILITY OF EMERGENCY INFORMATION IN CASE IN WHICH USER IS PRESENT INSIDE VEHICLE CABIN |
| (2) | MUFFLER / EXHAUST SUBMERGENCE SENSOR | PROVIDE INFORMATION WARNING OF ENGINE STALL |
| (1) | HIGH-VOLTAGE SYSTEM BATTERY / POWER SUPPLY SUBMERGENCE SENSOR | PROVIDE INFORMATION WARNING OF ELECTRIC SHOCK |

FIG. 10

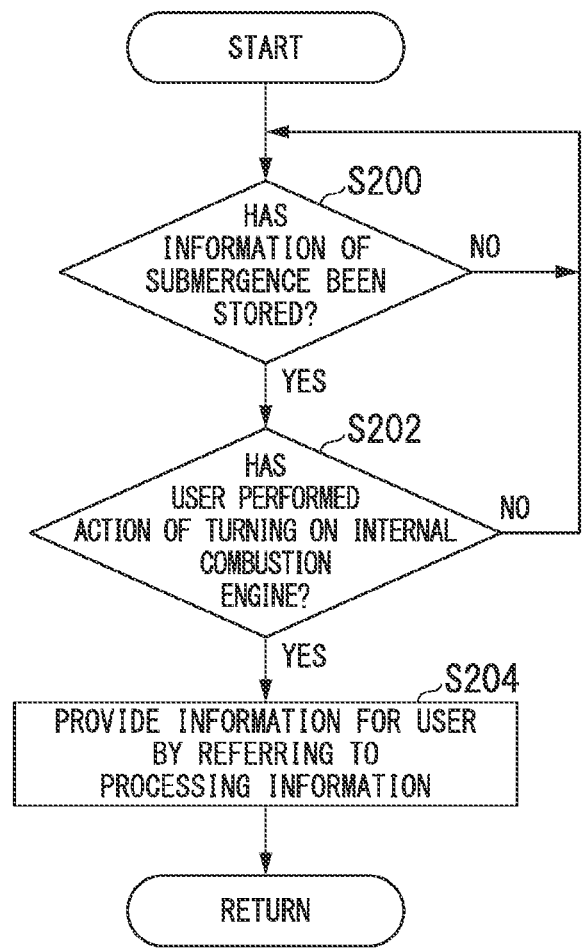

FIG. 11

| IDENTIFICATION NUMBER | TYPE OF SENSOR | PAST SUBMERGENCE DETECTION STATE | CONTROL DETAILS OF CONTROLLER AT TIME OF SUBMERGENCE |
|---|---|---|---|
| (5) | INTAKE SUBMERGENCE SENSOR | ○ | PROVIDE INFORMATION WARNING OF MALFUNCTION OF INTERNAL COMBUSTION ENGINE |
| (4) | ENGINE SUBMERGENCE SENSOR | ○ | PROVIDE INFORMATION WARNING OF STOPPING OF INTERNAL COMBUSTION ENGINE |
| (2) | EXHAUST SUBMERGENCE SENSOR | ○ | PROVIDE INFORMATION WARNING OF ENGINE STALL |
| (1) | POWER SUPPLY SUBMERGENCE SENSOR | ○ | PROVIDE INFORMATION WARNING OF ELECTRIC SHOCK |

WATER LEVEL ←

| IDENTIFICATION NUMBER | TYPE OF SPECIFIC DEVICE | | CONTROL DETAILS OF CONTROLLER AT TIME OF SUBMERGENCE | PRIORITY LEVEL |
|---|---|---|---|---|
| | CONTROL DEVICE | | | |
| | COMMUNICATION UNIT | | | |
| (5) | AIR CLEANER | INTAKE SUBMERGENCE SENSOR | PROVIDE INFORMATION WARNING OF MALFUNCTION OF INTERNAL COMBUSTION ENGINE | 5 |
| (4) | INTERNAL COMBUSTION ENGINE | ENGINE SUBMERGENCE SENSOR | PROVIDE INFORMATION WARNING OF STOPPING OF INTERNAL COMBUSTION ENGINE | 4 |
| (3) | DOOR SUBMERGENCE SENSOR | | NOTIFY NOTIFICATION FACILITY OF EMERGENCY INFORMATION IN CASE IN WHICH THERE IS USER INSIDE VEHICLE CABIN | 1 |
| (2) | MUFFLER | EXHAUST SUBMERGENCE SENSOR | PROVIDE INFORMATION WARNING OF ENGINE STALL | 3 |
| (1) | HIGH-VOLTAGE SYSTEM BATTERY | POWER SUPPLY SUBMERGENCE SENSOR | PROVIDE INFORMATION WARNING OF ELECTRIC SHOCK | 2 |

VEHICLE, VEHICLE CONTROL METHOD, AND PROGRAM

TECHNICAL FIELD

The present invention relates to a vehicle, a vehicle control method, and a program.

BACKGROUND ART

Conventionally, vehicle escape guide devices that open or close front seat power windows and rear seat power windows in accordance with a submergence status of a vehicle that has been detected by a submergence sensor and inform of an escape method according to the submergence status using speech or notify the outside of submergence using a communication means have been disclosed (for example, see Patent Document 1).

CITATION LIST

Patent Literature

[Patent Document 1]
Japanese Unexamined Patent Application, First Publication No. 2001-88638
[Patent Document 2]
Japanese Unexamined Patent Application, First Publication No. 2015-136969
[Patent Document 3]
Japanese Unexamined Patent Application, First Publication No. 2006-256370

SUMMARY OF INVENTION

Technical Problem

However, there are cases in which the device described above does not appropriately notify of a submergence status of a vehicle.

The present invention is in view of such situations, and one object thereof is to provide a vehicle, a vehicle control method, and a program capable of performing appropriate notification in accordance with a submergence status of a vehicle.

Solution to Problem (1) A vehicle according to one aspect of the present invention is a vehicle including: a communicator configured to communicate with an external terminal; an acquirer configured to acquire detection results acquired by sensors disposed in predetermined portions of the vehicle; an estimator configured to estimate submerged portions of the vehicle that is submerged on the basis of the detection results acquired by the acquirer; and a controller configured to change a communication destination of the vehicle by controlling the communicator in accordance with the submerged portions estimated by the estimator.

(2) In the aspect (1) described above, the estimator estimates whether or not one or more portions set in advance become submerged portions.

(3) In the aspect (2) described above, the one or more portions set in advance include at least some of portions in which a power supply of the vehicle, a motor of the vehicle, an intake system of the vehicle, and an exhaust system of the vehicle are disposed.

(4) In any one of the aspects (1) to (3) described above, the controller causes a display disposed in the vehicle to output a warning in a case in which a user is present inside the vehicle and notifies a terminal device of a user of the vehicle of a warning in a case in which no user is present inside the vehicle.

(5) In the aspect (2) or (3) described above, the estimator estimates whether or not a power supply of the vehicle is the submerged portion, and in a case in which it is estimated that the power supply is the submerged portion, the controller causes a display disposed in the vehicle to display information warning of electric shock.

(6) In the aspect (2) or (3) described above, the estimator estimates whether or not a power supply of the vehicle is the submerged portion, and in a case in which it is estimated that the power supply is the submerged portion, the controller notifies a terminal device of a user of the vehicle of information warning of electric shock.

(7) In the aspect (2) or (3) described above, an internal combustion engine is mounted in the vehicle, the estimator estimates whether or not the internal combustion engine of the vehicle is the submerged portion, and in a case in which it is estimated that the internal combustion engine is the submerged portion, the controller performs one or both of control of causing a display disposed in the vehicle to display information warning of stopping of the internal combustion engine of the vehicle and control of notifying a terminal device of a user of the vehicle of information warning of stopping of the internal combustion engine of the vehicle.

(8) In the aspect (2) or (3) described above, an internal combustion engine is mounted in the vehicle, the estimator estimates whether or not an intake system of the vehicle is the submerged portion, and in a case in which it is estimated that the intake system is the submerged portion, the controller performs one or both of control of causing a display disposed in the vehicle to display information warning of a malfunction of the internal combustion engine of the vehicle and control of notifying a terminal device of a user of the vehicle of information warning of a malfunction of the internal combustion engine of the vehicle.

(9) In any one of the aspects (1) to (8) described above, in a case in which a user performs an action of starting the internal combustion engine of the vehicle after information warning of a malfunction of the internal combustion engine is provided to the user, the controller causes the display to display information about submergence of the internal combustion engine before the starting.

(10) In any one of the aspects (1) to (9) described above, the controller causes a display to display information indicating a risk of a user of the vehicle not being able to escape from the vehicle on the basis of the submerged portions estimated by the estimator.

(11) In any one of the aspects (1) to (10) described above, the estimator estimates whether or not a door of the vehicle is the submerged portion, and in a case in which a user is present inside the vehicle, the controller gives an emergency notification to an external terminal using the communicator in a case in which the door is estimated to have been submerged by the estimator.

(12) In the aspect (11) described above, the communicator includes two or more communicators, and in a case in which the door is estimated to have been submerged by the estimator, the controller gives the emergency notification using a communicator used for an emergency notification out of the communicators.

(13) In any one of the aspects (1) to (12) described above, in a case in which it is estimated by the estimator that there are a plurality of submerged portions, the controller transmits information indicating an order of submergence of the submerged portions to a communication destination of the vehicle.

(14) In the aspect (13) described above, in a case in which a door is included in the plurality of submerged portions, and a vehicle occupant is in the vehicle, the controller transmits information indicating the order of submergence of the submerged portions to an emergency notification destination that is a communication destination of the vehicle.

(15) According to one aspect of the present invention, there is provided a vehicle control method using a computer, the vehicle control method including: acquiring detection results acquired by sensors disposed in predetermined portions of a vehicle; estimating submerged portions of the vehicle that is submerged on the basis of the acquired detection results; and changing a communication destination of the vehicle by controlling a communicator communicating with an external terminal in accordance with the estimated submerged portions.

(16) A program according to one aspect of the present invention is a program causing a computer to execute: acquiring detection results acquired by sensors disposed in predetermined portions of a vehicle; estimating submerged portions of the vehicle that is submerged on the basis of the acquired detection results; and changing a communication destination of the vehicle by controlling a communicator communicating with an external terminal in accordance with the estimated submerged portions.

Advantageous Effects of Invention

According to (1) to (16), an appropriate notification can be given in accordance with a submergence status of a vehicle.

According to (4), information is output in accordance with a position (inside a vehicle cabin or outside a vehicle cabin) at which a user is present, and thus the user can acquire useful information.

According to (9), in a case in which a user performs an action of starting the internal combustion engine of the vehicle after information warning of a malfunction of the internal combustion engine is provided to the user, the display is caused to display information about submergence of the internal combustion engine before starting, and thus inappropriate starting of the internal combustion engine is further inhibited.

According to (13) or (14), the information indicating the order in which the submerged portions have been submerged is transmitted to a communication destination of the vehicle, and thus a side that has acquired the information can estimate a status of the vehicle. In this way, the vehicle can assist the side that has acquired the information with estimating the status of the vehicle.

BRIEF DESCRIPTION OF DRAWINGS

FIG. 2 is a diagram showing an example of an outer appearance of the vehicle M according to this embodiment and arrangement of specific devices.

FIG. 3 is a diagram showing an example of details of correspondence information 110.

FIG. 10 is a flowchart showing an example of the flow of a process performed by the controller 98.

FIG. 11 is a diagram showing an example of details of processing information 120 and details of control.

FIG. 12 is a diagram showing an example of details of correspondence information 110A according to a second embodiment.

DESCRIPTION OF EMBODIMENTS

First Embodiment

Figure 1:
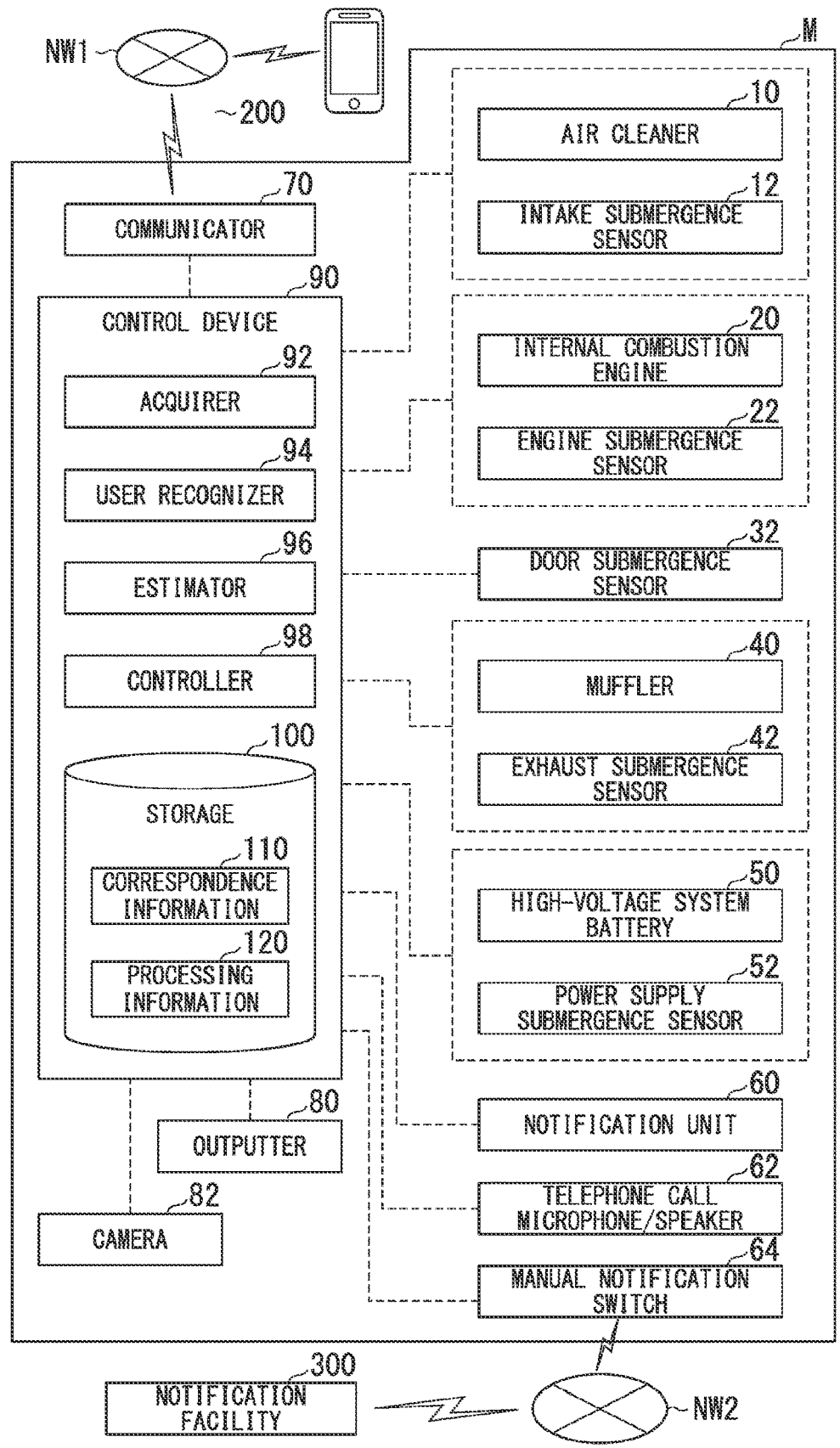
FIG. 1 is a diagram showing an example of the functional configuration of a vehicle system 1 including a vehicle M according to this embodiment.

FIG. 1 is a diagram showing an example of the functional configuration of a vehicle system 1 including a vehicle M according to this embodiment. The vehicle system 1 includes a vehicle M, a terminal device 200, and a notification facility 300. The vehicle M and the terminal device 200 communicate with each other via a network NW1. The network NW1, for example, includes a cellular network, a Wi-Fi network, the Internet, a wide area network (WAN), a local area network (LAN), a public line, a provider device, a dedicated line, a radio base station, and the like. The vehicle M and the notification facility 300 communicate with each other via a network NW2. The vehicle M and the terminal device 200 or the notification facility 300 may directly perform radio communication with each other without involving any network NW.

The terminal device 200, for example, is a terminal device that can be carried by a user such as a smartphone, a tablet terminal, a personal computer, or the like. The terminal device 200 performs a predetermined instruction for the vehicle M or acquires information transmitted by the vehicle M by communicating with a communicator 70 of the vehicle M. For example, the acquired information is displayed on a display of the terminal device 200.

The notification facility 300 acquires a request from the vehicle M when flood damage or the like occurs and performs a process for rescuing a user of the vehicle M in accordance with the acquired request. For example, the notification facility 300 dispatches a rescue team to the vehicle M or instructs a predetermined organization to rescue the user of the vehicle M.

The vehicle M, for example, includes an air cleaner 10 (an intake system), an intake submergence sensor 12, an internal combustion engine 20 (a motor), an engine submergence sensor 22, a door submergence sensor 32, a muffler 40, an exhaust submergence sensor 42 (an exhaust system), a high-voltage system battery 50 (a power supply), a power supply submergence sensor 52, a notification unit 60, a telephone call microphone/speaker 62, a manual notification switch 64, a communicator 70, an outputter 80, a camera 82, and a control device 90. Hereinafter, functional components other than the notification unit 60 to the control device 90 may be referred to as "specific devices." FIG. 2 is a diagram showing an example of an outer appearance of the vehicle M according to this embodiment and arrangement of specific devices. In the following description, a positional relation and the like will be described appropriately using an XYZ coordinate system. An X direction is a center axis direction of the vehicle body (a forward direction), and a Y direction is a widthwise direction of the vehicle, that is, a direction orthogonal to the X direction in a horizontal plane. A Z direction is a direction that is orthogonal to the X direction and the Y direction. The arrangement of the specific devices shown in FIG. 2 is an example and may be arbitrarily set for each vehicle type.

In order of the power supply submergence sensor 52, the high-voltage system battery 50, the exhaust submergence sensor 42, the muffler 40, the door submergence sensor 32, the engine submergence sensor 22, the internal combustion engine 20, the intake submergence sensor 12, and the air cleaner 10, these functional components are mounted in the vehicle M from a negative Z direction side (a ground side). For example, when water has built up near the vehicle M, and the water level thereof continues to rise, the functional components are submerged in the order of the functional components described above.

The air cleaner 10, the intake submergence sensor 12, the internal combustion engine 20, the engine submergence sensor 22, the muffler 40, the exhaust submergence sensor 42, the high-voltage system battery 50, and the power supply submergence sensor 52 are disposed at the same position in the Z direction and thus are submerged at the same timing as the water level rises.

The intake submergence sensor 12 detects submergence of its own device. In other words, the intake submergence sensor 12 detects that the air cleaner 10 has been submerged. The intake submergence sensor 12 includes a casing and a detector that detects a fluid housed in the casing. For example, micro flow passages (or holes) communicating with a detector are provided in the casing. For example, flow passages are disposed on a negative Z direction side in a state in which the casing is disposed in the vehicle M. When the intake submergence sensor 12 is submerged, and a predetermined water pressure is applied in the casing, for example, a fluid flows into a space in which the detector is disposed through the flow passages described above in accordance with a capillary phenomenon or the like.

The detector includes a first electrode, a second electrode, and a circuit board. The first electrode and the second electrode are connected to the circuit board. The first electrode and the second electrode face each other in a state in which they are separated by a predetermined distance. When a fluid such as water or the like is present between the first electrode and the second electrode, the first electrode and the second electrode are conductive through the fluid. The circuit board detects a change in a resistance value between the first electrode and the second electrode that has changed in accordance with the conduction described above and outputs an on signal representing submergence on the basis of a result of the detection to the controller 98. For example, in a case in which the degree of change in the resistance value exceeds a threshold, the circuit board outputs an on signal. For example, the engine submergence sensor 22, the door submergence sensor 32, and the exhaust submergence sensor 42 have functional configurations similar to that of the intake submergence sensor 12.

The air cleaner 10 filters air taken into the internal combustion engine 20. The filtered air is mixed with a fuel in the internal combustion engine 20 to become a mixed gas, and this mixed gas is compressed. Then, the compressed mixed gas combusts in the internal combustion engine 20.

The internal combustion engine 20 generates power and outputs the generated power to a vehicle shaft. For example, the internal combustion engine 20 is a gasoline engine or a diesel engine.

The engine submergence sensor 22 detects submergence of its own device. In other words, the engine submergence sensor 22 detects submergence of the internal combustion engine 20.

The door submergence sensor 32 detects submergence of its own device. In other words, the door submergence sensor 32 detects submergence of doors of the vehicle M. The submergence of doors is a state in which the water level rises to a degree at which a user in the vehicle M is not able to open the doors. The door submergence sensor 32 is disposed at a position for detecting a fluid in a case in which the water level corresponds to submergence of doors (a degree at which a user is not able to open the door on his own) on the basis of experiment results or simulation results.

The muffler 40 discharges a gas generated in the internal combustion engine 20 to the outside as an exhaust gas.

The exhaust submergence sensor 42 detects submergence of its own device. In other words, the exhaust submergence sensor 42 detects submergence of the muffler 40.

For example, the high-voltage system battery 50 is a chargeable/rechargeable secondary battery. The high-voltage system battery 50 can output a voltage higher than that of a low-voltage (for example, 12 V) battery that is disposed in the vehicle M. The high-voltage system battery 50 supplies electric power to a predetermined device through a power drive unit that is not shown.

The power supply submergence sensor 52 detects submergence of its own device. In other words, the power supply submergence sensor 52 detects submergence of the high-voltage system battery 50.

The notification unit 60 is disposed on a positive Z direction side from the door submergence sensor 32 in the Z direction. The notification unit 60 includes a communication antenna, a battery, a communication controller, a location positioner, and the like. For example, the battery, the communication controller, and the location positioner are housed in a casing and are disposed inside a vehicle cabin. For this reason, the notification unit 60 has resistance of a predetermined degree also to submergence. The notification unit 60 notifies the notification facility 300 on the basis of an instruction from the controller 98. At this time, location information acquired by positioning using the location positioner is transmitted to the notification facility 300. The communication antenna may be disposed at a position different from that of the notification unit 60. The notification unit 60 may be disposed at an arbitrary position such as a predetermined position inside the vehicle cabin at which it can be operated by a vehicle occupant, a position at which it can be visually recognized by a vehicle occupant inside the vehicle cabin, or the like.

The telephone call microphone/speaker 62 operates in a case in which a vehicle occupant performs a predetermined operation or a vehicle occupant inputs predetermined speech, or a predetermined sensor described above outputs an on signal. Alternatively, the telephone call microphone/speaker 62 operates on the basis of an instruction from the notification facility 300. For example, in a case in which the telephone call microphone/speaker 62 is operated, the communicator 70 and the notification facility 300 come into a communicable state. The telephone call microphone/speaker 62 transmits speech input by a vehicle occupant to the notification facility 300 using the communicator 70 or outputs speech acquired from the notification facility 300. The manual notification switch 64 transmits an emergency notification to the notification facility 300 in accordance with an operation of a vehicle occupant.

The description will now return to FIG. 1. For example, the communicator 70 is disposed on a positive Z direction side from the air cleaner 10 in the Z direction. For example, the communicator 70 communicates with the terminal device 200, other vehicles, and the like. The notification unit 60 and the communicator 70 may be configured to be integrated together, or the communicator 70 may have the function of the notification unit 60. The control device 90 may be configured to be integrated with one or both of the notification unit 60 and the communicator 70.

The outputter 80 is a speaker, a display, an instrument, or the like. The outputter 80 outputs information indicating submergence of a specific device or information warning of accompanying submergence on the basis of an instruction from the controller 98.

The camera 82 is a digital camera using a solid-state imaging device such as a charge coupled device (CCD), a complementary metal oxide semiconductor (CMOS), or the like. The camera 82 is attached to a position at which a user inside the vehicle cabin can be imaged such as a ceiling, above a front windshield, or the like. For example, the camera 82 periodically images an appearance of the inside of the vehicle cabin.

The control device 90 includes an acquirer 92, a user recognizer 94, an estimator 96, a controller 98, and a storage 100. The acquirer 92, the user recognizer 94, the estimator 96, and the controller 98, for example, are realized by a hardware processor such as a central processing unit (CPU) or the like executing a program (software). Some or all of such constituent elements may be realized by hardware (a circuit; including circuitry) such as a large scale integration (LSI), an application specific integrated circuit (ASIC), a field-programmable gate array (FPGA), a graphics processing unit (GPU), or the like or may be realized by software and hardware in cooperation. The program may be stored in advance in a storage device (a storage device including a non-transitory storage medium) such as an HDD or a flash memory of the control device 90 or may be stored in a storage medium that can be loaded or unloaded such as a DVD or a CD-ROM and installed in an HDD or a flash memory of the control device 90 by loading the storage medium (a non-transitory storage medium) into a drive device.

The storage 100 is realized by an HDD, a flash memory, an electrically erasable programmable read only memory (EEPROM), a read only memory (ROM), a random access memory (RAM), or the like. For example, the correspondence information 110, processing information 120, and the like to be described below are stored in the storage 100.

The acquirer 92 acquires a detection result acquired by a submergence sensor disposed at a predetermined portion of the vehicle M.

The user recognizer 94 determines whether or not a user is present in the vehicle M and outputs a result of the determination to the controller 98. The user recognizer 94, for example, analyzes an image captured by the camera 82 and recognizes an action of a user on the basis of a result of the analysis.

The estimator 96 estimates a submerged portion of the vehicle M that has been submerged on the basis of a detection result acquired by the acquirer 92. The estimator 96 determiners whether or not one or more portions set in advance become submerged portions. The one or more submerged portions set in advance include at least some of portions in which the air cleaner 10, the internal combustion engine 20, the muffler 40, and the high-voltage system battery 50 are disposed.

The controller 98 changes a communication destination of the vehicle M by controlling the notification unit 60 or the communicator 70 in accordance with a submerged portion estimated by the estimator 96. The provision to a user is one or both of provision of an image or speech to the outputter 80 of the vehicle M for the user and provision of an image or speech to the terminal device 200 of the user to the user by using the controller 98. For example, the controller 98 causes a display disposed in the vehicle M to output a warning in a case in which a user is present inside the vehicle M and notifies the terminal device 200 of the user of the vehicle M of a warning in a case in which no user is present inside the vehicle M. For example, the controller 98 performs control as shown in FIG. 3 below.

FIG. 3 is a diagram showing an example of details of the correspondence information 110. In the correspondence information 110, relations between a water level, specific devices that will be submerged, and control details are regulated. As shown in FIG. 3, control is performed in order of (1) to (5) in accordance with an increase in the water level.

(1. First Information Process)

In a case in which the high-voltage system battery 50 is submerged, the controller 98 provides information warning the user of electric shock.

(2. Second Information Process)

In a case in which the muffler 40 is submerged, the controller 98 provides information warning the user of an engine stall.

(3. Third Information Process)

In a case in which the door submergence sensor 32 is submerged, the controller 98 notifies the notification facility 300 of an emergency notification in a case in which a user is present inside the vehicle cabin of the vehicle M.

(4. Fourth Information Process)

In a case in which the internal combustion engine 20 is submerged, the controller 98 provides information warning the user of stopping of the internal combustion engine 20.

(5. Fifth Information Process)

In a case in which the air cleaner 10 is submerged, the controller 98 provides information warning the user of a malfunction of the internal combustion engine 20.

[Processing of (1. First Information Process) Described Above]

Figure 4:
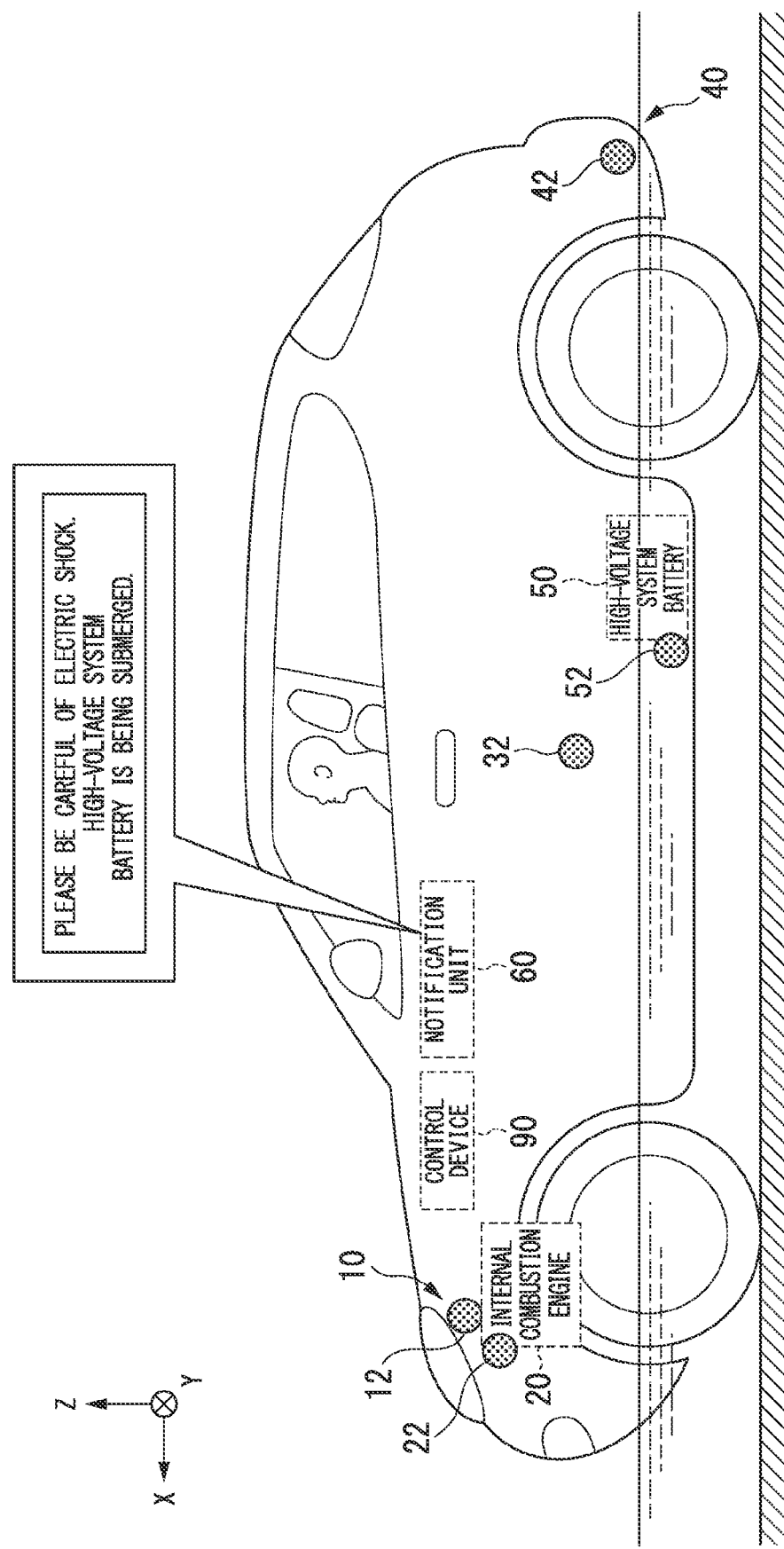
FIG. 4 is a conceptual diagram of the case in which the processing of (1. First information process) described above is performed.

FIG. 4 is a conceptual diagram of the case in which the processing of (1. First information process) described above is performed. For example, when the water level rises and the high-voltage system battery 50 is submerged, information warning of electric shock is output to the outputter 80 of the vehicle M. In accordance with this, a user of the vehicle can be careful of electric shock and thus can perform cautionary action.

[Processing of (2. Second Information Process) Described Above]

Figure 5:
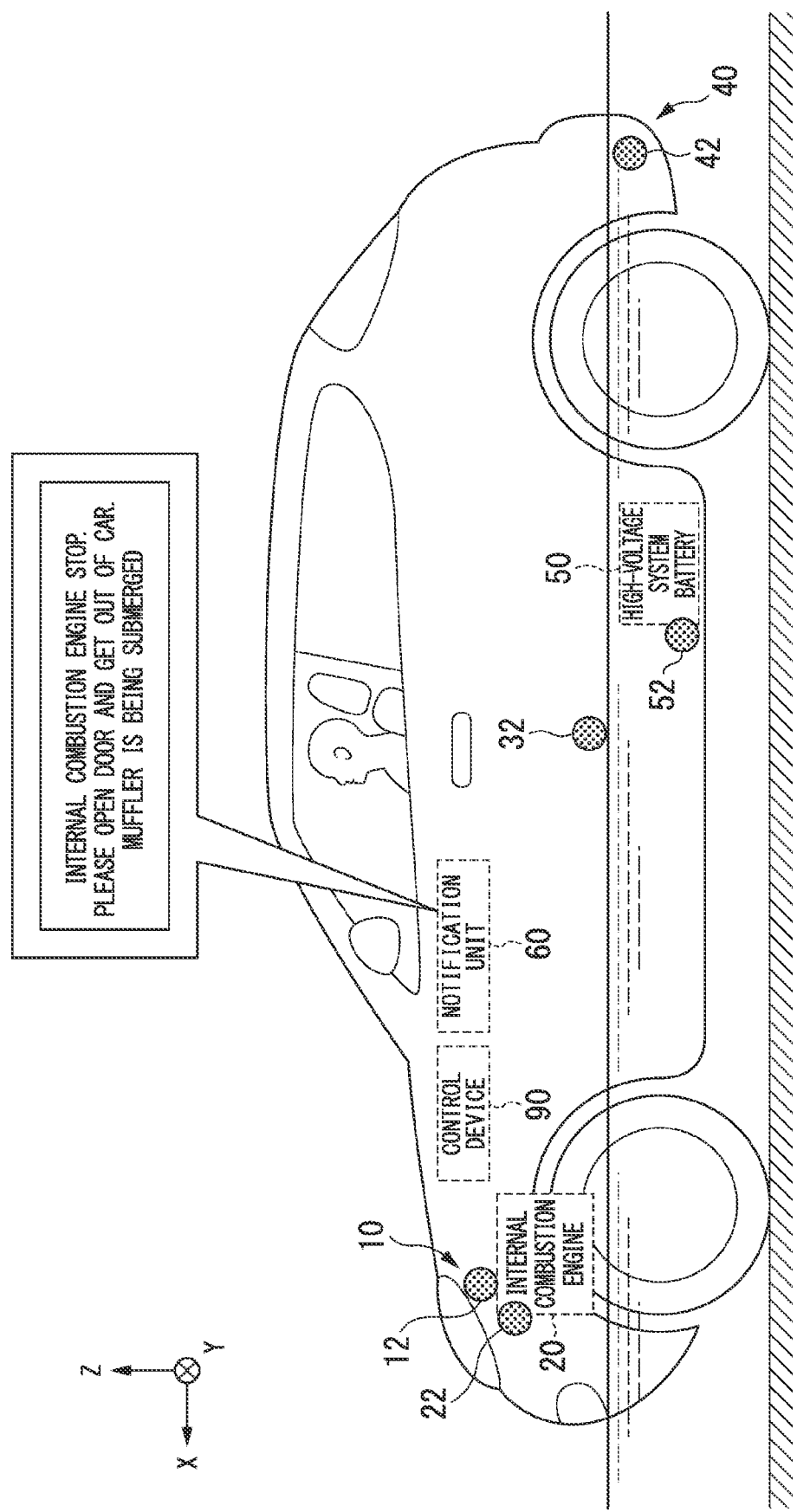
FIG. 5 is a conceptual diagram of the case in which the processing of (2. Second information process) described above is performed.

FIG. 5 is a conceptual diagram of the case in which the processing of (2. Second information process) described above is performed. For example, when the water level further rises more than the example of FIG. 4, and the exhaust submergence sensor 42 is submerged, an exhaust gas is accumulated in the internal combustion engine 20, or air is not accepted into the internal combustion engine 20, and thus the internal combustion engine 20 stops. For this reason, information warning of stopping of the internal combustion engine 20 is output to the outputter 80 of the vehicle M. In accordance with this, a user of the vehicle can be careful of stopping of the internal combustion engine 20 and thus can perform a cautionary action.

[Processing of (3. Third Information Process) Described Above]

Figure 6:
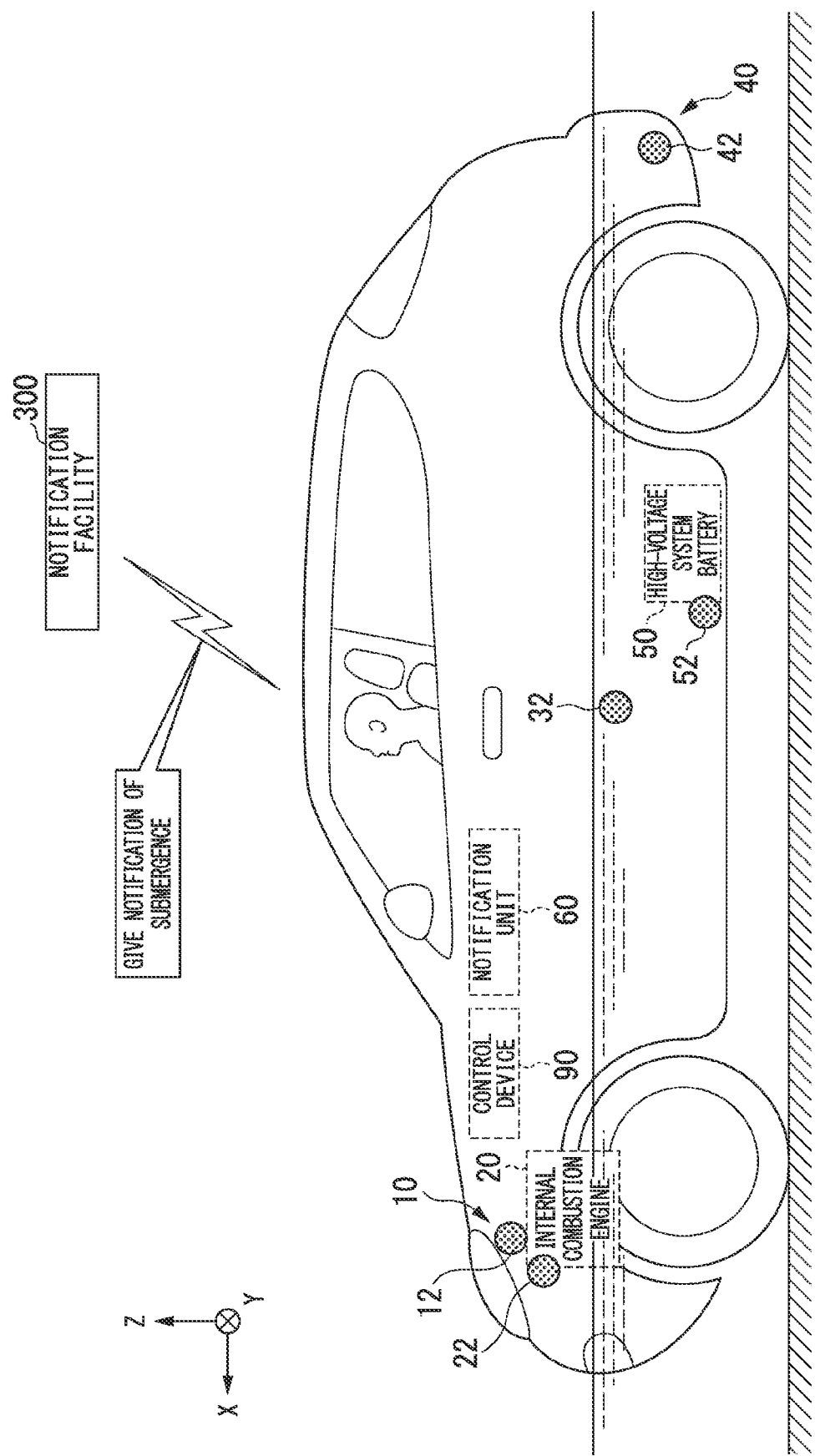
FIG. 6 is a conceptual diagram of the case in which the processing of (3. Third information process) described above is performed.

FIG. 6 is a conceptual diagram of the case in which the processing of (3. Third information process) described above is performed. For example, in a state in which a user is in the vehicle M, when the water level rises more than the example shown in FIG. 5, and the door submergence sensor 32 is submerged, an emergency notification is notified to the notification facility 300. In accordance with this, a rescue is requested without a user of the vehicle requesting a rescue on his own.

[Processing of (5. Fifth Information Process) Described Above]

Figure 7:
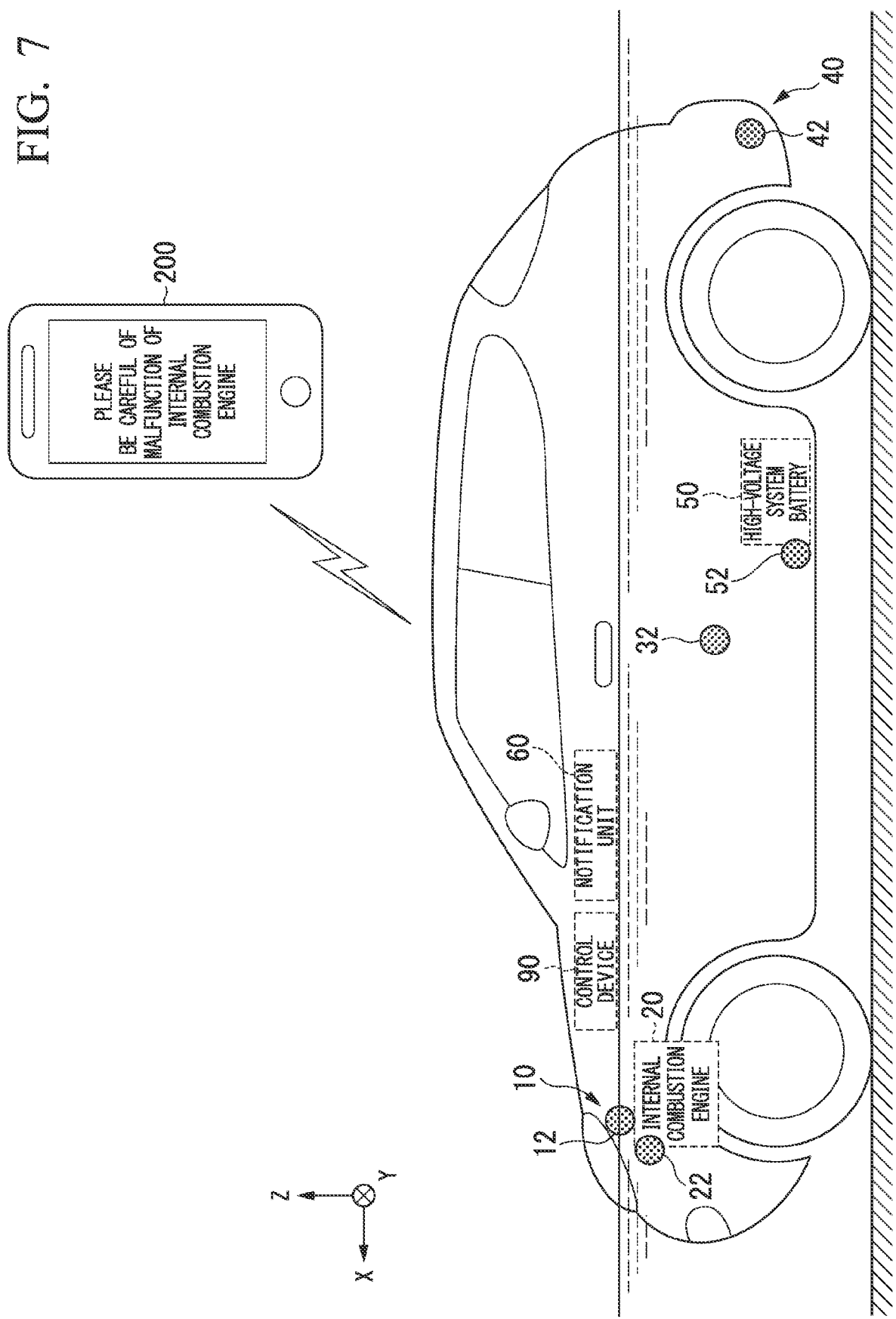
FIG. 7 is a conceptual diagram of the case in which the processing of (5. Fifth information process) described above is performed.

FIG. 7 is a conceptual diagram of the case in which the processing of (5. Fifth information process) described above is performed. For example, when the water level rises more than the example of FIG. 6, and the intake submergence sensor 12 is submerged, a water hammering phenomenon in which air containing a large amount of moisture enters the air cleaner 10 and thus does not reach a fuel without the air and the fuel being compressed may occur. For this reason, information warning of a malfunction of the internal combustion engine 20 is output to the outputter 80 of the vehicle M. In accordance with this, a user of the vehicle can be careful of a malfunction of the internal combustion engine 20 and thus can perform a cautionary action.

In the example of FIGS. 4 and 5 or FIG. 7, even in a case in which a user is present inside the vehicle cabin of the vehicle M, the controller 98 may provide information warning of specific devices according to the status shown in FIGS. 4 and 5 or FIG. 7 for the terminal device 200 of the user. In the example of FIGS. 4 and 5 or FIG. 7 described above, in a case in which no user is present inside the vehicle cabin of the vehicle M, the controller 98 may provide information warning of specific devices according the status of FIGS. 4 and 5 or FIG. 7 for the terminal device 200 of the user.

In the example of FIGS. 4 and 5 or FIG. 7 described above, in a case in which no user is present inside the vehicle cabin of the vehicle M, the controller 98 further may provide information indicating no approach to the vehicle M for the terminal device 200 of the user.

[Flowchart (1)]

Figure 8:
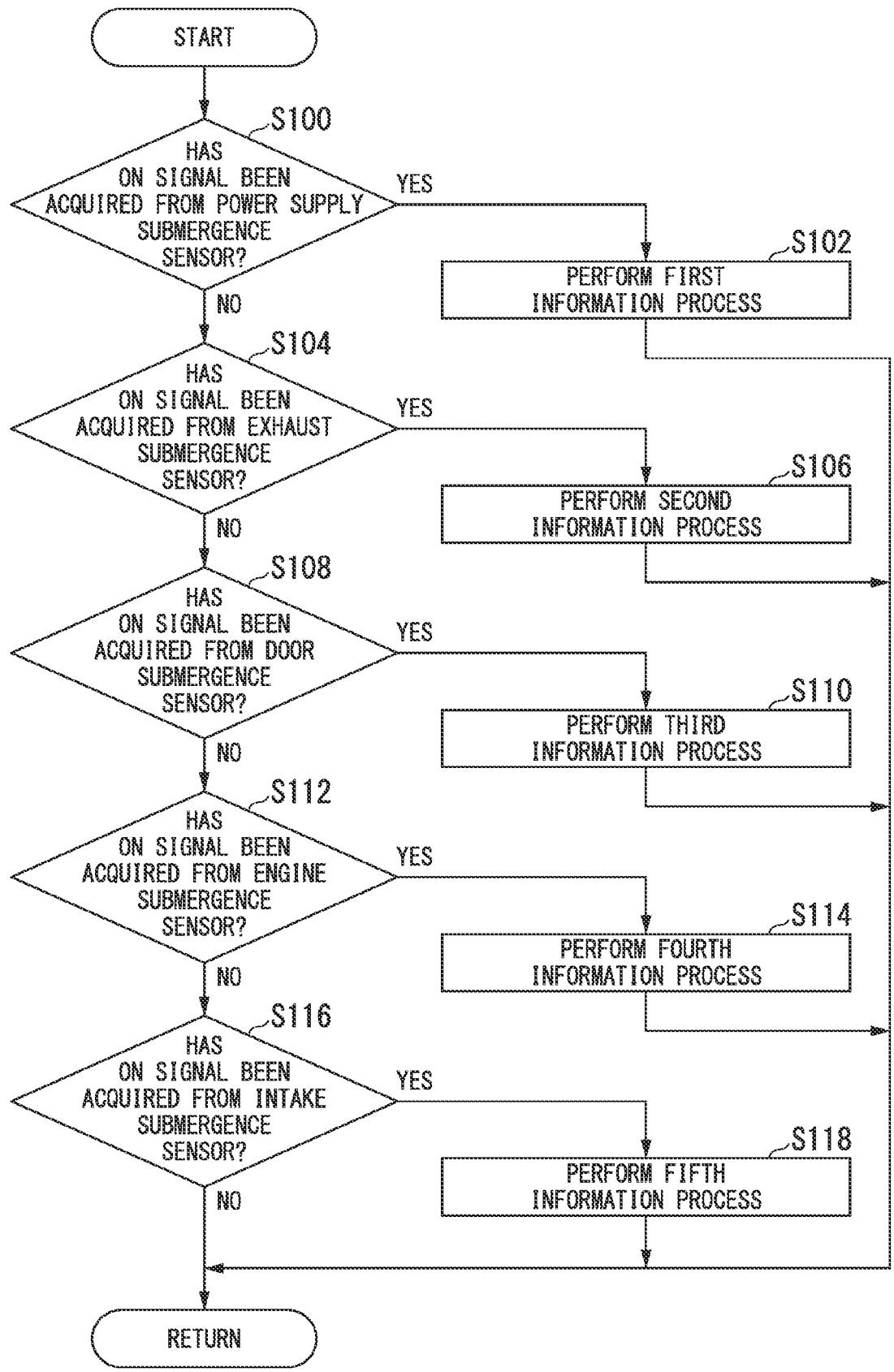
FIG. 8 is a diagram showing an example of the flow of a process performed by a controller 98.

FIG. 8 is a diagram showing an example of the flow of a process performed by the controller 98. First, the controller 98 determines whether or not an on signal has been acquired from the power supply submergence sensor 52 (Step S100). In a case in which an on signal has been acquired from the power supply submergence sensor 52, the controller 98 performs a first information process (Step S102).

In a case in which an on signal has not been acquired from the power supply submergence sensor 52, the controller 98 determines whether or not an on signal has been acquired from the exhaust submergence sensor 42 (Step S104). In a case in which an on signal has been acquired from the exhaust submergence sensor 42, the controller 98 performs a second information process (Step S106).

In a case in which an on signal has not been acquired from the exhaust submergence sensor 42, the controller 98 determines whether or not an on signal has been acquired from the door submergence sensor 32 (Step S108). In a case in which an on signal has been acquired from the door submergence sensor 32, the controller 98 performs a third information process (Step S110).

In a case in which an on signal has not been acquired from the door submergence sensor 32, the controller 98 determines whether or not an on signal has been acquired from the engine submergence sensor 22 (Step S112). In a case in which an on signal has been acquired from the engine submergence sensor 22, the controller 98 performs a fourth information process (Step S114).

In a case in which an on signal has not been acquired from the engine submergence sensor 22, the controller 98 determines whether or not an on signal has been acquired from the intake submergence sensor 12 (Step S116). In a case in which an on signal has been acquired from the intake submergence sensor 12, the controller 98 performs a fifth information process (Step S118). In a case in which one process among the first information process to the fifth information process is performed, processing information 120 indicating that the process has been performed is stored in the storage 100. In accordance with this, the process of one routine of this flowchart ends.

In the process described above, in a case in which the exhaust submergence sensor 42 or the power supply submergence sensor 52 disposed in a negative Z direction from the door submergence sensor 32 outputs an on signal, the controller 98 may open the doors and allow the user to come out of the vehicle. The controller 98 may cause the display to display information indicating a risk of the user of the vehicle M being unable to escape from the vehicle M on the basis of a portion estimated by the estimator 96. In a case in which the submerged portion estimated by the estimator 96 is the muffler 40, the controller 98 provides information indicating a risk being higher than information indicating a risk of being unable to escape that is output in a case in which the submerged portion estimated by the estimator 96 is the high-voltage system battery 50 for the user.

Sensors other than the sensors described above may be provided. For example, another door submergence sensor may be disposed on a negative Z direction side from the door submergence sensor 32. This another door submergence sensor 32, for example, is disposed at a position on a negative Z direction side by a predetermined distance from a position for detecting a water level for which the doors are unable to be open in accordance with a water pressure. In a case in which another door submergence sensor outputs an on signal, the controller 98 provides information urging a user to open the door and come out of the vehicle for the user. In other words, the controller 98 causes the display to display information indicating a risk of a user of the vehicle M not being able to escape from the vehicle M.

Some of the sensors and the specific devices described above may be omitted, and some of the processes of the flowchart of FIG. 8 described above may be omitted. For example, in a case in which the arrangement of the specific devices is different, the processes of the flowchart may be interchanged in accordance with the arrangement. For example, the position of the muffler 40 is disposed in a negative Z direction from the position of the high-voltage system battery 50, after the processes of Steps S104 and Step S106, the processes of Steps S100 and S102 are performed.

[Process after Lowering of Water Level]

Figure 9:
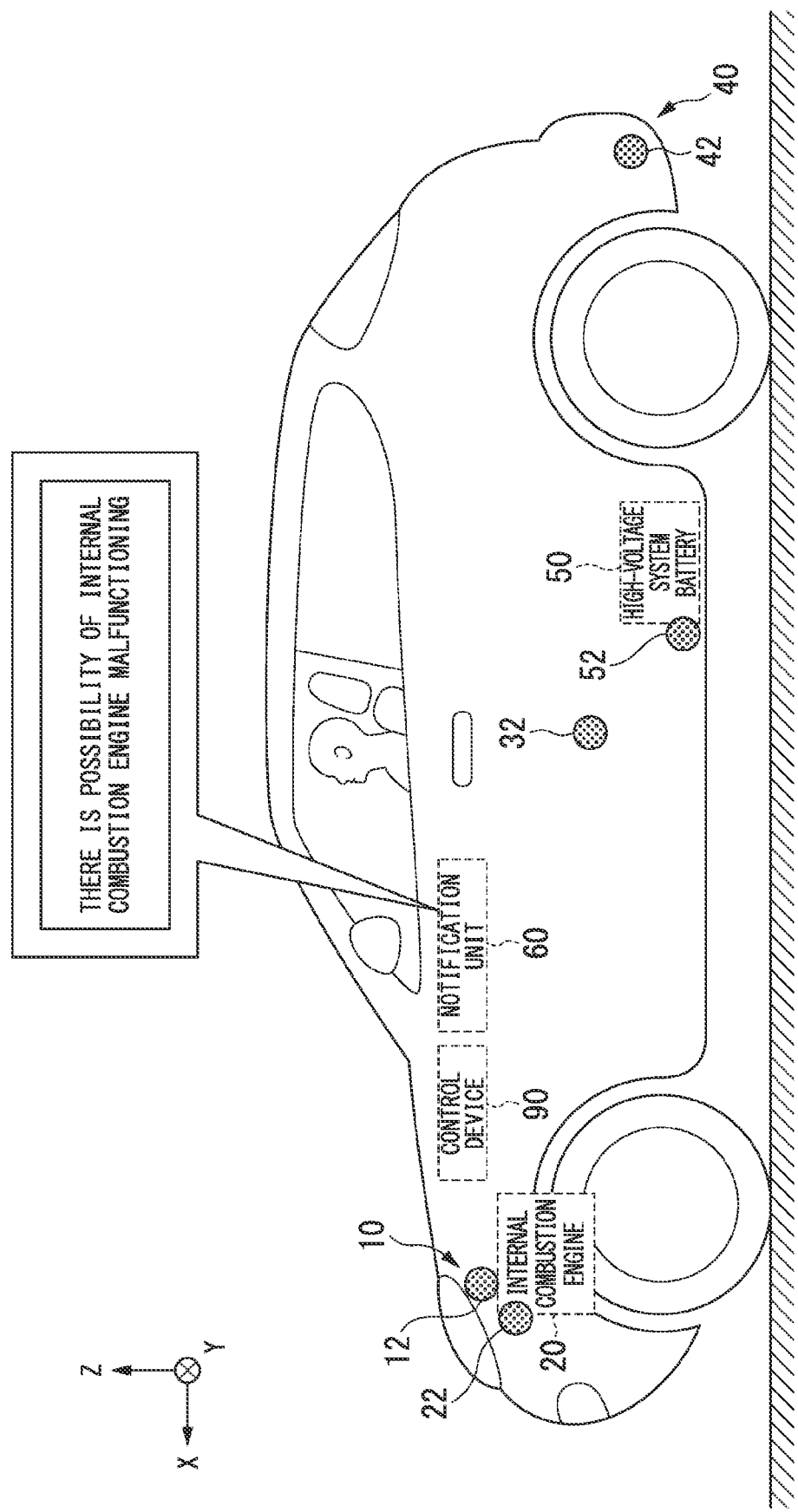
FIG. 9 is a conceptual diagram of a case in which a process is performed after a water level lowers from a water level shown in FIG. 7.

FIG. 9 is a conceptual diagram of the case in which a process is performed after a water level lowers from the water level shown in FIG. 7. In a case in which a user performs an action of starting the internal combustion engine 20 of the vehicle M after information warning of a malfunction of the internal combustion engine 20 is provided to the user, the controller 98 causes the display to display information about submergence of the internal combustion engine 20 before starting. For example, in a case in which the water level lowers after submergence of the air cleaner 10, when a user performs an action for operating the internal combustion engine 20, the controller 98 causes the outputter 80 to output presence of a possibility of a malfunction of the internal combustion engine 20 to the user. At this time, the controller 98 may prohibit the operation of the internal combustion engine 20. For example, the controller 98 may cause the display to display information warning of a malfunction of the internal combustion engine 20, information indicating prohibition of the operation of the internal combustion engine 20 due to the presence of a possibility of a malfunction, or the like or may cause a speaker to output speech for warning or the like.

The action of the user for operating the internal combustion engine 20 is user's getting in the vehicle M, user's inserting a key into a key cylinder, inserting a key into a key cylinder and operating the key, pressing an on button for turning on power, and the like. Such an action may be detected on the basis of a recognition result acquired by the user recognizer 94 or may be detected on the basis of a detection result acquired by a sensor (for example, a sensor disposed in the key cylinder) of the vehicle M, a signal acquired by an ECU or the like, or the like.

[Flowchart (2)]

FIG. 10 is a flowchart showing an example of the flow of a process performed by the controller 98. For example, this process is a process that is performed in a case in which the water level lowers after submergence of the vehicle M. First, the controller 98 determines whether or not information about submergence is stored by referring to the processing information 120 (Step S200). In a case in which it is determined that information about submergence is stored, the controller 98 determines whether or not the user has performed an action of turning on power (Step S202).

In a case in which the user has not performed the action of turning on power, the process is returned to the process of Step S200. In a case in which the user has performed the action of turning on power, the controller 98 provides information as shown in FIG. 11 to be described below for the user by referring to the processing information 120 (Step S204). In this way, the process of one routine of this flowchart ends.

FIG. 11 is a diagram showing an example of details of processing information 120 and details of control. The example shown in FIG. 11 shows details of the processing information 120 after the water level becomes a water level for which the intake submergence sensor 12 outputs an on signal. In the process of Step S204 shown in FIG. 10, one piece of information (1) to (5) is output. For example, in a case in which a plurality of sensors output on signals in the past, control associated with a sensor disposed at a higher position in the vehicle M in the processing information 120 may be performed (information may be output to the outputter 80 of the vehicle M), or control associated with a sensor may be performed.

(1) In a case in which the power supply submergence sensor 52 outputs an on signal in the past, information warning of electric shock is output.

(2) In a case in which the exhaust submergence sensor 42 outputs an on signal in the past, information warning of an engine stall is output.

(4) In a case in which the engine submergence sensor 22 outputs an on signal in the past, information warning of stopping of the internal combustion engine is output.

(5) In a case in which the intake submergence sensor 12 outputs an on signal in the past, information warning of a malfunction of the internal combustion engine is output.

As described above, by changing a communication destination of the vehicle M using the controller 98 by controlling the communicator 70 or the notification unit 60 in accordance with a submerged portion of the vehicle that is estimated to be submerged, an appropriate notification can be given in accordance with a submerged status of the vehicle.

[Comparison (1)]

In a case in which a submergence sensor disposed in a vehicle outputs an on signal regardless of presence/absence of a user inside the vehicle, there are cases in which a device of a comparative example gives a notification to a notification facility or gives a notification to a notification facility even in a state in which a user can open the door on his own. In such cases, for example, in a case in which submergence of a plurality of vehicles occurs, there are cases in which each of the vehicles gives a notification to the notification facility 300, and thus a communication line may be congested, or the number of persons for rescue may become insufficient.

In contrast to this, in a case in which necessity for giving a notification to the notification facility 300 is high, the control device 90 according to this embodiment gives a notification to the notification facility 300. In accordance with this, useless notification is inhibited, or resources for rescue are appropriately distributed. In this way, the control device 90 can perform an appropriate notification according to a submerged status of the vehicle M.

[Comparison (2)]

For an action of a user who has forgotten submergence of a vehicle for causing the vehicle to be in an operated state after the submergence of the vehicle (for example, a high-voltage system battery, a muffler, an internal combustion engine, and an air cleaner), there are cases in which a device of a comparative example does not sufficiently perform warning or the like. For this reason, a malfunction due to a water hammer and the like may occur.

In contrast to this, in this embodiment, warning and the like are performed for an action of a user who has forgotten submergence of a vehicle for operating the vehicle after submergence of the vehicle. For this reason, occurrence of a malfunction due to a water hammer and the like is inhibited.

In the process described above, submergence sensors detect submergence. Instead of this, the controller 98 may estimate submergence on the basis of another technique or additionally using another technique and perform the first information process to the fifth information process on the basis of a result of the estimation. For example, the controller 98 may estimate that a specific device has been submerged on the basis a signal or a response state acquired from a predetermined ECU that controls an intake device taking air in the internal combustion engine 20, the internal combustion engine 20, an exhaust device controlling the state of an exhaust gas discharged to the internal combustion engine 20, the high-voltage system battery 50, and the like. Then, the controller 98 may perform the first information process to the fifth information process on the basis of a result of the estimation. For example, the controller 98 may estimate submergence of the muffler 40 on the basis of a result of a pressure sensor detecting the pressure of the inside of the muffler 40 output by a predetermined ECU. For example, in a case in which the pressure changes to represent a pattern that is experimentally requested in advance such as a pattern in which the pressure increases for a short period and then decreases, the muffler 40 is determined to be submerged. In a case in which a predetermined detection value changes to represent a pattern requested in advance as above for another specific device, it is determined that the predetermined specific device has been submerged.

In the embodiment, although the vehicle M has been described to travel using power output by the internal combustion engine 20, the configuration is not limited thereto. The vehicle M may be an electric car traveling using power output by a motor (or another motor) or a hybrid vehicle traveling using power output by one or both of a motor and the internal combustion engine 20. In such a case, for example, a motor submergence sensor detecting submergence of a motor is disposed at a position at which the motor is disposed. The position at which the motor is disposed is a position on a negative Z direction side from the door submergence sensor 32 in the Z direction or the same position as that of the internal combustion engine 20 in the Z direction. In a case in which the motor submergence sensor detects submergence of the motor, the controller 98 provides information indicating that the motor is short-circuited for a user.

According to the embodiment described above, by including the communicator (60, 70) communicating with the external terminal (200, 300), the acquirer 92 acquiring a detection result acquired by a sensor disposed in a predetermined portion of the vehicle M, the estimator 96 estimating a submerged portion of the vehicle M that has been submerged on the basis of a detection result acquired by the acquirer 92, and the controller 98 changing a communication destination of the vehicle M by controlling the communicator in accordance with the submerged portion estimated by the estimator 96, an appropriate notification according to a submergence status of the vehicle can be given.

Second Embodiment

Hereinafter, a second embodiment will be described. In the second embodiment, in a case in which on signals are acquired from a plurality of sensors, a control device 90 determines control details in accordance with types of the sensors that have output the acquired on signals, presence/absence of a vehicle occupant, and the like. The control device 90 transmits information indicating an order in which submerged portions have been submerged to a communication destination of a vehicle. Hereinafter, points different from the first embodiment will be focused on in the description.

In the second embodiment, correspondence information 110A is used in place of the correspondence information 110. FIG. 12 is a diagram showing an example of details of the correspondence information 110A according to the second embodiment. In addition to the details of the correspondence information 110, information representing a priority level of each sensor is associated in the correspondence information 110A. The priority level is information indicating whether a process corresponding to a certain sensor is prioritized in a case in which the control device 90 acquires on signals from a plurality of sensors. For example, in a case in which on signals are acquired from two sensors, the control device 90 performs a process corresponding to a sensor having a higher priority level out of the sensors that have output the on signals with priority. For example, the priority level is higher in order of a door submergence sensor 32 (identification information (3)), a power supply submergence sensor 52 (identification information (1), an exhaust submergence sensor 42 (identification information (2), an engine submergence sensor 22 (identification information (4), and an intake submergence sensor 12 (identification information (5)). Hereinafter, sensors with which such priority levels are associated may be referred to as "a plurality of sensors".

[Flowchart]

Figure 13:
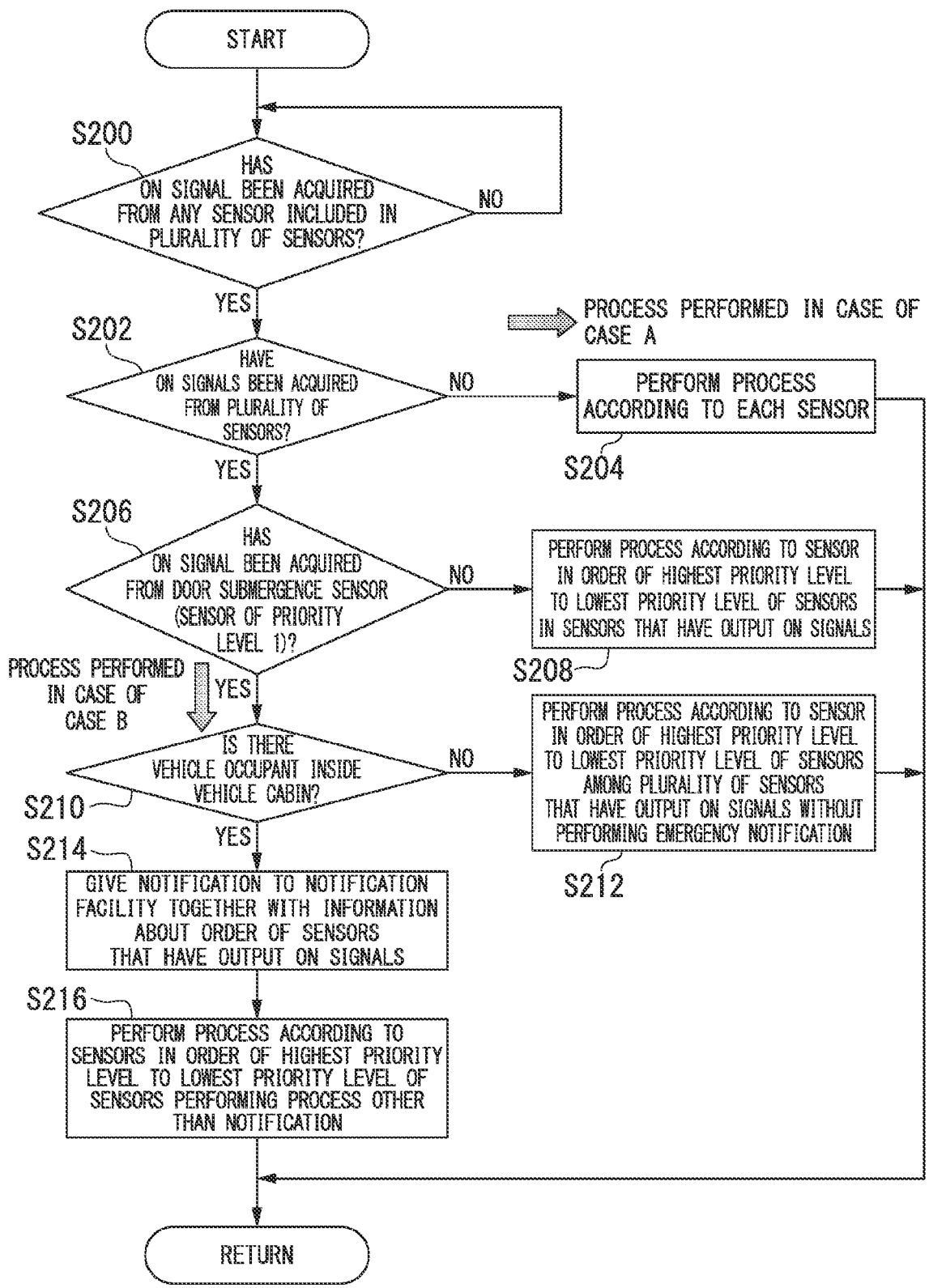
FIG. 13 is a diagram showing an example of the flow of a process performed by a controller 98 according to the second embodiment.

FIG. 13 is a diagram showing an example of the flow of a process performed by a controller 98 according to the second embodiment. First, the controller 98 determines whether or not an on signal has been acquired from any one sensor included in a plurality of sensors (Step S200). For example, the controller 98 monitors the state of each sensor with a predetermined period and stores results of the monitoring in a storage device. In a case in which the on signal has been acquired from any one sensor, the controller 98 determines whether or not on signals have been acquired from a plurality of sensors (two or more sensors) (Step S202). In a case in which the on signals have not been acquired from the plurality of sensors (in a case in which the on signal has been acquired from one sensor), the controller 98 performs a process according to each sensor (Step S204). The process according to each sensor is, as shown in FIG. 12 described above, a process that is performed in a case in which a sensor outputs an on signal. For example, in a case in which the power supply submergence sensor 52 has output an on signal, information warning of electric shock is provided to a vehicle occupant and the like. Then, the process of one routine of this flowchart ends.

Figure 14:
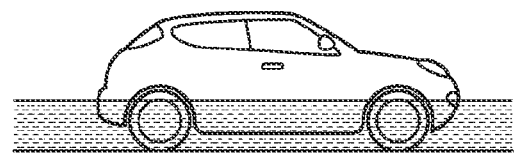
FIG. 14 is a diagram showing an example of a view (case A) in which processes of Steps S200 to S204 are repeatedly performed.

FIG. 14 is a diagram showing an example of a view (case A) in which processes of Steps S200 to S204 are repeatedly performed. For example, a case in which the water level gradually raises from the ground will be assumed. In this case, the power supply submergence sensor 52 outputs an on signal, and information warning of electric shock is provided, next, the exhaust submergence sensor 42 outputs an on signal, and information warning of an engine stall is provided, and next, the door submergence sensor 32 outputs an on signal and, in a case in which a user is present inside the vehicle cabin, an emergency notification is given to the notification facility 300 (an example of an emergency notification destination).

The description of FIG. 13 will be continued. In a case in which on signals have been acquired from a plurality of sensors (in a case in which on signals have been acquired from two or more sensors), the controller 98 determines whether or not an on signal has been acquired from the door submergence sensor 32 (the sensor having a priority level "1") (Step S206). In a case in which no on signal has been acquired from the door submergence sensor 32, the controller 98 performs processes according to sensors for the sensors that have output the on signals in order of the highest priority level to the lowest priority level of the sensors (Step S208). For example, in a case in which the power supply submergence sensor 52 and the exhaust submergence sensor 42 output on signals, after information warning of electric shock is provided, information warning of an engine stall is provided.

In a case in which an on signal has been acquired from the door submergence sensor 32, the controller 98 determines whether or not a vehicle occupant is present inside the vehicle cabin (Step S210). The determination of presence/absence of a vehicle occupant may be performed on the basis of an image captured by the user recognizer 94 using the camera 82 or may be performed on the basis of a detection result acquired by a seating sensor disposed in a seat of the vehicle or a detection result acquired by a sensor that detects a safety belt fastening state. The detection of presence/absence of a vehicle occupant may be performed in advance before this process. The reason for this is that, in a case in which presence of a vehicle occupant has been detected in advance, a notification can be quickly given by a notification facility.

In a case in which no vehicle occupant is present inside the vehicle cabin, the controller 98 performs processes according to the sensors in order of the highest priority level to the lowest priority level of the sensors for the plurality of sensors that have output the on signals without giving an emergency notification (Step S212).

In a case in which a vehicle occupant is present inside the vehicle cabin, the controller 98 gives a notification to the notification facility 300 together with information relating to an order of the sensors that have output the on signals (Step S214). Next, the controller 98 performs processes other than the notification. In other words, the controller 98 performs processes according to sensors in order of the highest priority level to the lowest priority level of the sensors among the sensors that have output on signals (Step S216). In accordance with this, the process of one routine of this flowchart ends. Some processes among the processes of this flowchart (for example, Step S216) may be omitted.

Figure 15:
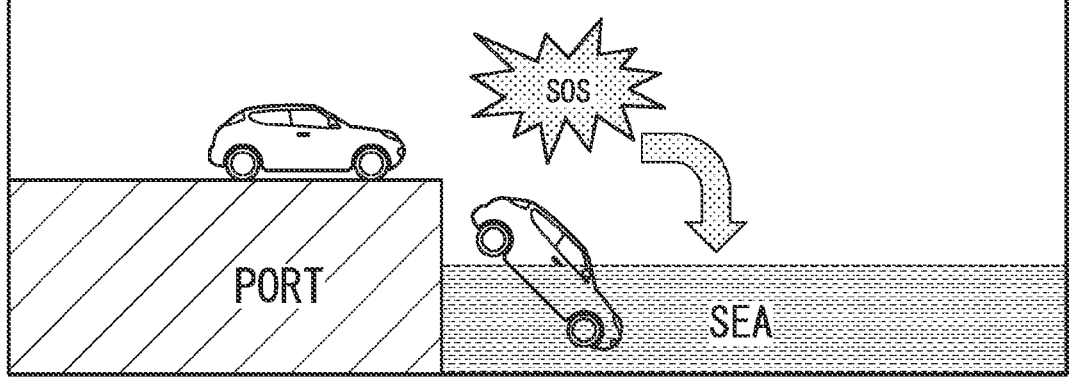
FIG. 15 is a diagram showing an example of a view in which a door submergence sensor outputs an on signal in Step S206.
Figure 16:
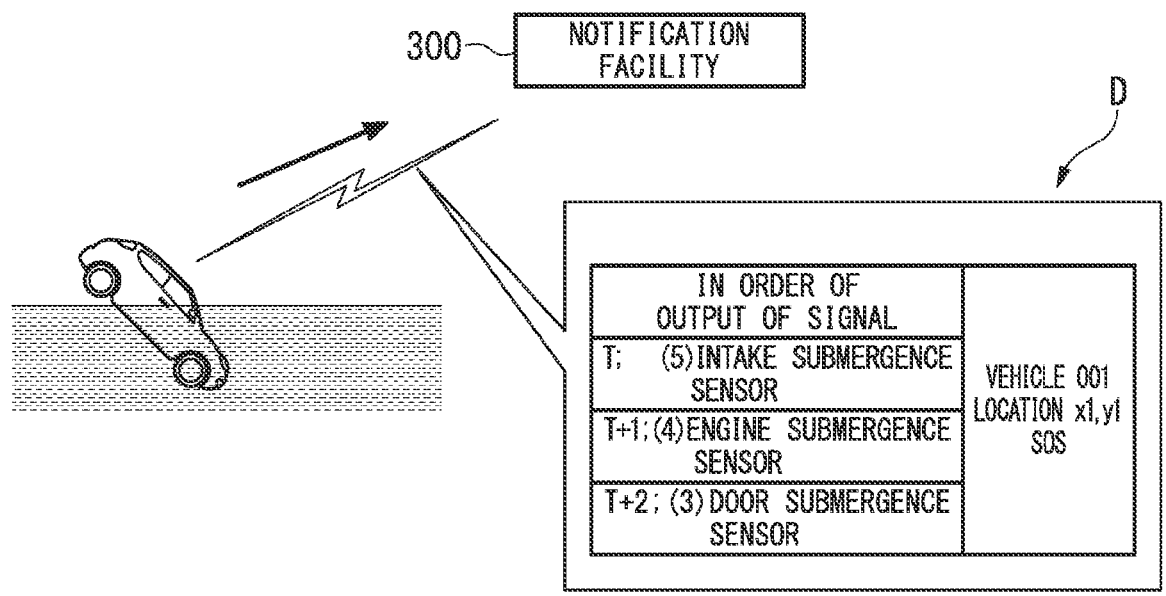
FIG. 16 is a diagram showing an example of a view in which notification information is transmitted.

FIG. 15 is a diagram showing an example of a view in which the door submergence sensor outputs an on signal in Step S206. For example, in a case in which a vehicle falls into the sea or river, on signals of the sensors are output in an order different from that of a case in which the water level rises from the ground. For example, in a case in which the vehicle falls into the sear or the river, on signals are output in order of the intake submergence sensor 12, the engine submergence sensor 22, and the door submergence sensor 32. In this way, a plurality of sensors including the door submergence sensor 32 output on signals, and a vehicle occupant is present inside the vehicle cabin, as shown in FIG. 16, the controller 98 transmits notification information D to the notification facility 300. FIG. 16 is a diagram showing an example of a view in which notification information is transmitted. For example, the notification information D is information in which an order (or times) of sensors that have output signals, identification information of a vehicle, a location of the vehicle, and information indicating that the vehicle and a vehicle occupant are in an emergency state are associated with each other.

The notification facility 300 acquires the notification information as described above, whereby an operator or a processor of the notification facility 300 can estimate an accident status, for example, by referring to the order in which sensors output on signals, and a process according to the accident status can be performed. For example, the notification facility 300 (or the operator) can set up a plan for rescuing a vehicle occupant who is in an accident status (a status in which the vehicle has fallen into the sea or the like) having a high degree of emergency with priority. In addition, the processor of the notification facility 300 may automatically estimate an accident status on the basis of the notification information and cause the display to display a result of the estimation or output the result using speech. For example, in a case in which the notification information indicates that an on signal of the intake submergence sensor 12, an on signal of the engine submergence sensor 22, and an on signal of the door submergence sensor 32 are output in this order, the processor of the notification facility may determine that the vehicle is confronted with an accident status (a status in which the vehicle has fallen into the sea or the like) having a high degree of emergency. The information about the order of sensors that have output on signals may be transmitted to the terminal device 200 (a communication destination of the vehicle) in a case in which no vehicle occupant is in the vehicle M. In accordance with this, a user can estimate the accident status of the vehicle M.

According to the second embodiment described above, in a case in which it is estimated that there are a plurality of submerged portions, the controller 98 transmits information indicating the order in which the submerged portions have been submerged to a communication destination (for example, the notification facility 300 or the terminal device 200) of the vehicle and thus can assist a side that has acquired the information with estimating the status of the vehicle.

[Hardware Configuration]

Figure 17:
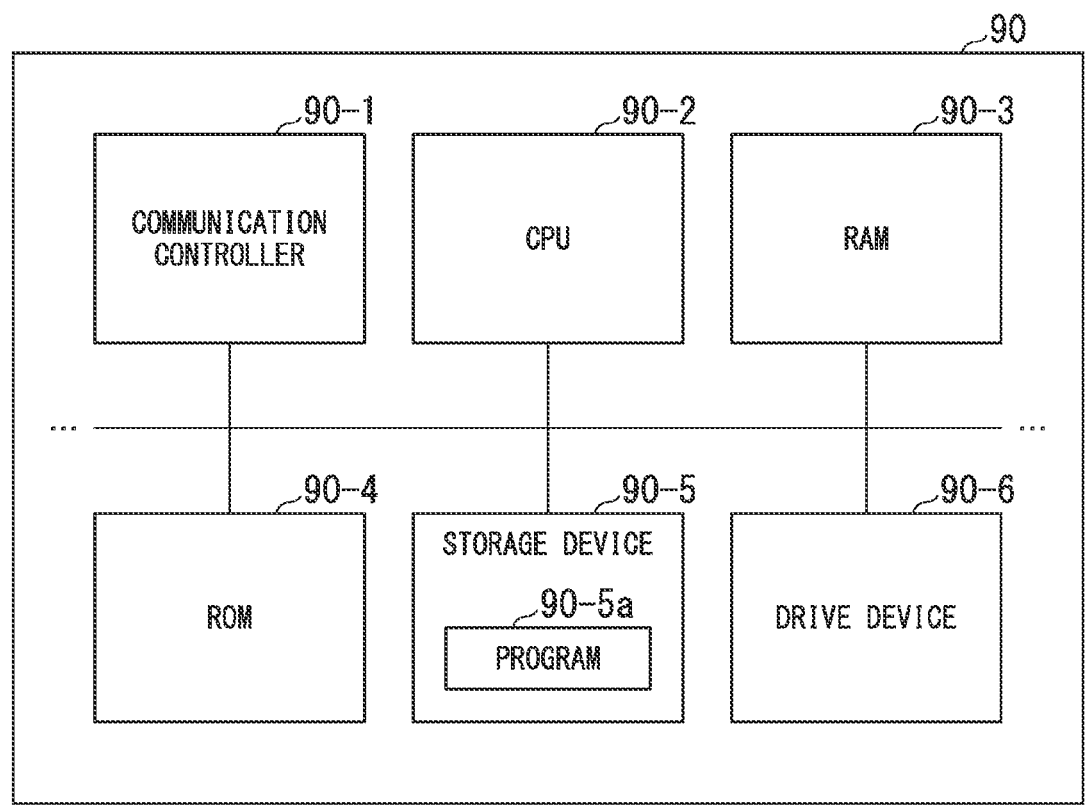
FIG. 17 is a diagram showing an example of the hardware configuration of a control device 90 according to an embodiment.

FIG. 17 is a diagram showing an example of the hardware configuration of the control device 90 according to an embodiment. As shown in the drawing, the control device 90 has a configuration in which a communication controller 90-1, a CPU 90-2, a random access memory (RAM) 90-3 used as a working memory, a read only memory (ROM) 90-4 storing a boot program and the like, a storage device 90-5 such as a flash memory or a hard disk drive (HDD), a drive device 90-6, and the like are interconnected through an internal bus or a dedicated communication line. The communication controller 90-1 communicates with constituent elements other than the control device 90. A program 90-5*a* executed by the CPU 90-2 is stored in the storage device 90-5. This program is expanded into the RAM 90-3 by a direct memory access (DMA) controller (not shown in the drawing) or the like and is executed by the CPU 90-2. In this way, some or all of the acquirer 92, the user recognizer 94, the estimator 96, and the controller 98 are realized.

The embodiments described above can be represented as below.

A vehicle including a storage device storing a program and a hardware processor and configured such that the hardware processor described above, by reading and executing the program stored in the storage device described above, acquires detection results acquired by sensors disposed in predetermined portions of a vehicle, estimates submerged portions of the vehicle that is submerged on the basis of the acquired detection results, and changes a communication destination of the vehicle by controlling a communicator communicating with an external terminal in accordance with the estimated submerged portions described above.

Although forms for performing the present invention have been described using the embodiments, the present invention is not limited to such embodiments at all, and various modifications and substitutions can be made in a range not departing from the concept of the present invention.

REFERENCE SIGNS LIST

M Vehicle
1 Vehicle system
10 Air cleaner
12 Intake submergence sensor
20 Internal combustion engine
22 Engine submergence sensor
32 Door submergence sensor
40 Muffler
42 Exhaust submergence sensor
50 High-voltage system battery
52 Power supply submergence sensor
60 Notification unit
70 Communicator
80 Outputter
90 Control device
92 Acquirer
94 User recognizer
96 Estimator
98 Controller
100 Storage
110 Correspondence information
120 Processing information
200 Terminal device
300 Notification facility

What is claimed is:

1. A vehicle comprising:
a processor configured to:
acquire detection results acquired by sensors disposed in predetermined portions of the vehicle;
estimate submerged portions of the vehicle that is submerged on the basis of the detection results; and
change a communication destination of the vehicle in accordance with the submerged portions,
wherein, in a case in which a user performs an action of starting an internal combustion engine of the vehicle after information warning of a malfunction of the internal combustion engine is provided to the user, the processor causes a display device to display information about submergence of the internal combustion engine before commencement of the action of starting and opens a door of the vehicle to permit an occupant of the vehicle to exit the vehicle.

2. The vehicle according to claim 1, wherein the processor estimates whether or not one or more portions set in advance become submerged portions.

3. The vehicle according to claim 2, wherein the one or more portions set in advance include at least some of portions in which a power supply of the vehicle, a motor of the vehicle, an intake system of the vehicle, and an exhaust system of the vehicle are disposed.

4. The vehicle according to claim 1, wherein the processor causes a display disposed in the vehicle to output a warning in a case in which a user is present inside the vehicle and notifies a terminal device of a user of the vehicle of a warning in a case in which no user is present inside the vehicle.

5. The vehicle according to claim 2,
wherein the processor estimates whether or not a power supply of the vehicle is the submerged portion, and
wherein, in a case in which it is estimated that the power supply is the submerged portion, the processor causes a display disposed in the vehicle to display information warning of electric shock.

6. The vehicle according to claim 3,
wherein the processor estimates whether or not a power supply of the vehicle is the submerged portion, and
wherein, in a case in which it is estimated that the power supply is the submerged portion, the processor notifies a terminal device of a user of the vehicle of information warning of electric shock.

7. The vehicle according to claim 2,
wherein an internal combustion engine is mounted in the vehicle,
wherein the processor estimates whether or not the internal combustion engine of the vehicle is the submerged portion, and
wherein, in a case in which it is estimated that the internal combustion engine is the submerged portion, the processor performs one or both of control of causing a display disposed in the vehicle to display information warning of stopping of the internal combustion engine of the vehicle and control of notifying a terminal device of a user of the vehicle of information warning of stopping of the internal combustion engine of the vehicle.

8. The vehicle according to claim 2,
wherein an internal combustion engine is mounted in the vehicle,
wherein the processor estimates whether or not an intake system of the vehicle is the submerged portion, and
wherein, in a case in which it is estimated that the intake system is the submerged portion, the processor performs one or both of control of causing a display disposed in the vehicle to display information warning of a malfunction of the internal combustion engine of the vehicle and control of notifying a terminal device of a user of the vehicle of information warning of a malfunction of the internal combustion engine of the vehicle.

9. The vehicle according to claim 1, wherein the processor causes a display to display information indicating a risk of a user of the vehicle not being able to escape from the vehicle on the basis of the submerged portions.

10. The vehicle according to claim 1,
wherein the processor estimates whether or not the door of the vehicle is the submerged portion, and
wherein, in a case in which a user is present inside the vehicle, the processor gives an emergency notification to an external terminal in a case in which the door is estimated to have been submerged.

11. The vehicle according to claim 10,
wherein, in a case in which the door is estimated to have been submerged, the processor gives the emergency notification.

12. The vehicle according to claim 1, wherein, in a case in which it is estimated that there are a plurality of submerged portions, the processor transmits information indicating an order of submergence of the submerged portions to a communication destination of the vehicle.

13. The vehicle according to claim 12, wherein, in a case in which the door is included in the plurality of submerged portions, and a vehicle occupant is in the vehicle, the processor transmits information indicating the order of submergence of the submerged portions to an emergency notification destination that is the communication destination of the vehicle.

14. A vehicle control method using a computer, the vehicle control method comprising:
   acquiring detection results acquired by sensors disposed in predetermined portions of a vehicle;
   estimating submerged portions of the vehicle that is submerged on the basis of the acquired detection results;
   changing a communication destination of the vehicle by controlling a communicator communicating with an external terminal in accordance with the estimated submerged portions; and
   in a case in which a user performs an action of starting an internal combustion engine of the vehicle after information warning of a malfunction of the internal combustion engine is provided to the user, causing a display device to display information about submergence of the internal combustion engine before commencement of the action of starting and causing a door of the vehicle to open to permit an occupant of the vehicle to exit the vehicle.

15. The vehicle according to claim 1, wherein the processor estimator estimates whether or not one or more portions set in advance become submerged portions,
   wherein the one or more portions set in advance include at least some of portions in which a power supply of the vehicle, a motor of the vehicle, an intake system of the vehicle, and an exhaust system of the vehicle are disposed, and
   wherein the processor causes a display disposed in the vehicle to output a warning in a case in which a user is present inside the vehicle and notifies a terminal device of a user of the vehicle of a warning in a case in which no user is present inside the vehicle.

16. The vehicle according to claim 1, wherein the processor estimates whether or not one or more portions set in advance become submerged portions,
   wherein the one or more portions set in advance include at least some of portions in which a power supply of the vehicle, a motor of the vehicle, an intake system of the vehicle, and an exhaust system of the vehicle are disposed,
   wherein the processor estimates whether or not a power supply of the vehicle is the submerged portion,
   wherein, in a case in which it is estimated that the power supply is the submerged portion, the processor causes a display disposed in the vehicle to display information warning of electric shock,
   wherein an internal combustion engine is mounted in the vehicle,
   wherein the processor estimates whether or not the internal combustion engine of the vehicle is the submerged portion,
   wherein, in a case in which it is estimated that the internal combustion engine is the submerged portion, the processor performs one or both of control of causing a display disposed in the vehicle to display information warning of stopping of the internal combustion engine of the vehicle and control of notifying a terminal device of a user of the vehicle of information warning of stopping of the internal combustion engine of the vehicle,
   wherein the processor estimates whether or not an intake system of the vehicle is the submerged portion, and
   wherein, in a case in which it is estimated that the intake system is the submerged portion, the processor performs one or both of control of causing a display disposed in the vehicle to display information warning of a malfunction of the internal combustion engine of the vehicle and control of notifying a terminal device of a user of the vehicle of information warning of a malfunction of the internal combustion engine of the vehicle.

17. A non-transitory computer-readable storage medium that stores a computer program to be executed by a computer to at least:
   acquire detection results acquired by sensors disposed in predetermined portions of a vehicle;
   estimate submerged portions of the vehicle that is submerged on the basis of the acquired detection results; and
   change a communication destination of the vehicle in accordance with the estimated submerged portions, wherein the vehicle is in communication with an external terminal,
   in a case in which a user performs an action of starting an internal combustion engine of the vehicle after information warning of a malfunction of the internal combustion engine is provided to the user, cause a display device to display information about submergence of the internal combustion engine before commencement of the action of starting and cause a door of the vehicle to open to permit an occupant of the vehicle to exit the vehicle.

* * * * *